April 28, 1970    H. WOESSNER    3,508,581
HIGH VACUUM VALVE
Filed Feb. 1, 1967

Hermann Woessner
INVENTOR.

BY

United States Patent Office 3,508,581
Patented Apr. 28, 1970

3,508,581
HIGH VACUUM VALVE
Hermann Woessner, Balzers, Liechtenstein, assignor to The Bendix Corporation, Rochester, N.Y., a corporation of Delaware
Filed Feb. 1, 1967, Ser. No. 613,251
Claims priority, application Switzerland, Feb. 5, 1966, 1,650/66
Int. Cl. F16k 11/02
U.S. Cl. 137—614.21                     2 Claims

ABSTRACT OF THE DISCLOSURE

A high vacuum valve, particularly for ultra-high vacuum, with a valve housing and gas entrance and gas exit connections. A valve seat arranged between the entrance and exit connections and a movable closure member or valve body compressible onto the seat with a predetermined closing force. The invention is characterized in that, in addition to the sealing valve member in the valve housing, an opposing movable valve member is provided which is compressible against the back side of the valve seat with an equal but opposing force. It is practical therefore, in addition to the valve member referred to, to also construct the opposing valve as a vacuum tight second valve body and to make the space between the two valve bodies evacuable.

BRIEF SUMMARY OF INVENTION

Figures 1, 2:
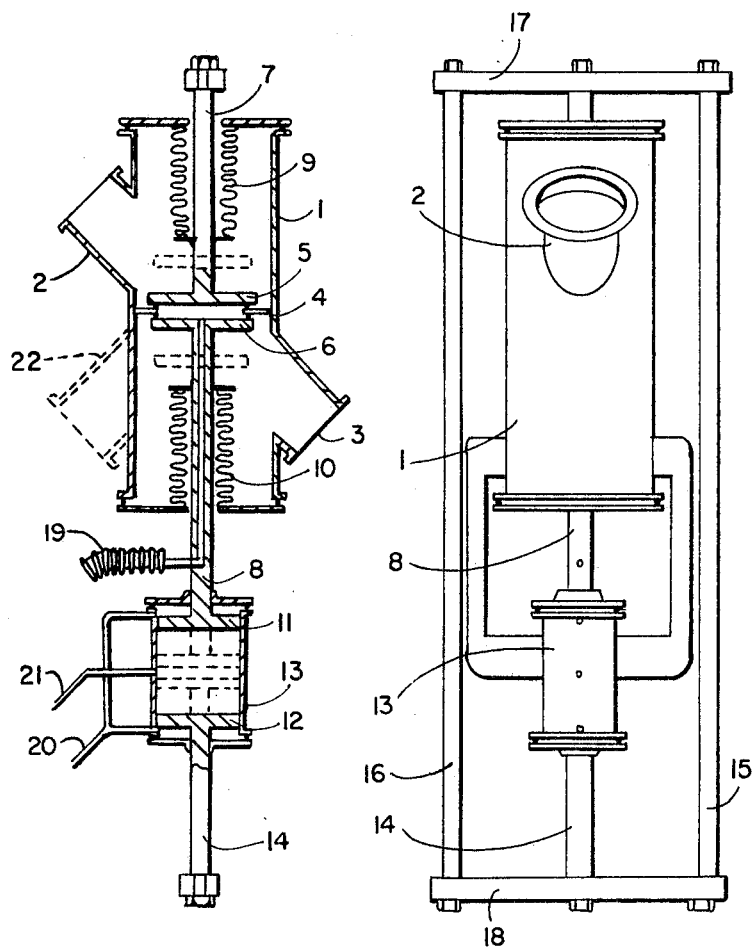

In high vacuum valves, especially in ultra-high vacuum valves, as is well known, organic sealing materials such as rubber or synthetic materials must be avoided because they give up too much gas. For that reason they should be constructed completely out of metal, preferably such metals as gold, copper, aluminum and so forth. As a consequence, very large forces are necessary for the production of the required closing pressures; for example, if a closing pressure of 500 kg. per cm. length of seal is used, a closing force of 15,700 kg. for a valve seat of 10 cm. diameter is required. This force would generally be produced hydraulically or pneumatically and be transferred through the valve cone or valve plate (generally the valve "body") to the valve housing. In order to assure a uniform closing pressure along the sealing zone, the valve housing must sustain no deformation from the mechanical stress. It must, therefore, be constructed with very strong walls, which gives rise to high cost and, in addition, has the disadvantage that on baking out, it is very conductive of heat and consequently tends toward additional thermal expansion and delay.

The object of the invention is to create a high vacuum valve, especially one suitable for ultra-high vacuum, in which these known disadvantages are avoided and which permits the use of an hydraulic or otherwise produced closing force of proper strength. The invention has special significance, therefore, for valves with large nominal diameters that require the large closing pressures.

FIGURE 1 is a cross-sectional view of a preferred form of my valve with external connecting tension rods removed. FIGURE 2 is a side view of my valve illustrating connecting rods.

An example of the carrying out of the invention will be described in more detail with the aid of the accompanying drawings. One (1) designates the valve housing with the entrance and exit connections 2 and 3. The valve seat 4 is situated between them. On opposite sides of the valve seat are disposed two opposing first and second valve closure members or bodies 5 and 6 which are compressible by means of the two pressure shafts 7 and 8 respectively. The two bodies 5 and 6 are represented as in sealing contact with the seat and the space between the two is constructed to be evacuable. For ultra-high vacuum applications, the known metal ring seals would be used as sealing elements, for example of silver, gold, copper or aluminum.

The closing motion for the two valve closure members is transmitted from the outside through the pressure shafts 7 and 8 which are carried through the walls of the valve housing by means of elastic, metal, vacuum tight bellows 9 and 10. The necessary pressure forces, which must be equal in magnitude and oppositely directed, are produced, in the example, by an hydraulic cylinder 13 furnished with a piston 11 and an opposing piston 12. The motion of the piston 11 is transmitted directly, while that of the piston 12 is transmitted by means of the piston shaft 14 and the tension rods 15 and 16 and the cross beams 17 and 18 forming a frame, to the appropriate valve member. If desired, the gas penetrating into the space between the two valve members can be removed, for which purpose the pressure rod 8 is made hollow and is connected through the conduit 19 with a low pressure space, for example, with the suction side of a forepump or an available vacuum pumping stand. In this way, the tightness of the valve is increased, especially in the case, that the one side is charged with atmospheric pressure and ultra-high vacuum is situated on the other. In addition, the fluid connections 20 and 21 for the hydraulic cylinder are shown on the drawing.

The invention provides the great advantage that the valve housing is independent of the distortion from the use of closing pressures and, therefore, may be made thin-walled, as is advantageous for the welding technique and necessary with regard to the external atmospheric pressure. It permits the easy bake-out of all parts of the valve coming in contact with the vacuum which are: the valve housing, the valve seat and the valve members as well as the flexible bellows lead throughs. Also in this regard, the possibility provided by the invention, of keeping the valve housing relatively thin-walled, works out favorably because the heat up and cool down times become significantly shortened in consequence of the smaller heat capacity of the thin-walled housing.

It is apparent that the construction, according to the invention, has importance especially for large valves, in that the saving of material in the building of the valve, made possible thereby, and the saving in heat energy in the baking out of the same, becomes of real importance. The valve, according to the invention, can also be constructed as an angle valve as is indicated as 22 with dotted lines in FIGURE 1.

I claim:
1. A high vacuum valve comprising:
a valve housing;
intake and exhaust connections formed in said valve housing;
a plate member disposed in said valve housing intermediate said intake and exhaust connections having an opening formed thereon to constitute a valve seat member;
first and second movable valve closure members compressible onto opposed sides of said valve seat member and operable to close said opening with opposing sealing forces of substantially equal magnitude;
said plate member being of a size insufficient to withstand, without deformation, the sealing force of one of said valve closure members in the absence of the sealing force of the other of said valve closure members whereby bake-out of the valve is facilitated; and
fluid cylinder means having double opposed pistons each of which is mechanically coupled to one of said valve closure members to provide said valve closure members with opposed sealing forces.

2. A high vacuum valve as claimed in claim 1 including evacuation means operative to evacuate a space between said first and second valve members when abutting said valve seat.

References Cited

UNITED STATES PATENTS

| | | | |
|---|---|---|---|
| 2,147,243 | 2/1939 | Cornell | 251—368 |
| 3,134,395 | 5/1964 | Glasgow | 137—637.2 |
| 794,014 | 7/1905 | Hopkinson | 137—630.19 |
| 875,021 | 12/1907 | Westbrook | 251—212 |
| 2,629,606 | 2/1953 | Fraser | 137—312 |
| 3,380,479 | 4/1968 | Bassan | 137—637 XR |

FOREIGN PATENTS

| | | |
|---|---|---|
| 1,027,688 | 4/1958 | Germany. |

ALAN COHAN, Primary Examiner

H. M. COHN, Assistant Examiner

U.S. Cl. X.R.

137—637.2; 251—175